: 2,888,464
Patented May 26, 1959

2,888,464
METHOXIMINOPENTENEONES

Seymour L. Shapiro, Hastings on Hudson, and Louis Freedman, Bronxville, N.Y., assignors to U.S. Vitamin Corporation, New York, N.Y., a corporation of Delaware No Drawing. Application April 9, 1958
Serial No. 727,261

7 Claims. (Cl. 260—340.5)

This invention is concerned with aryl substituted 4-methoximinopenta-1-ene-3-ones of the formula

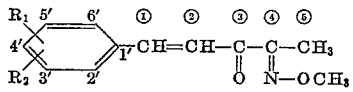

wherein $R_1$ and $R_2$ are substituents on the benzene ring alike and different, and are selected from the group consisting of hydrogen, hydroxy, alkoxy, alkyl, halogen and acetamido, and those structures wherein $R_1$ plus $R_2$ is methylenedioxy.

The compounds of this invention have valuable pharmacological properties particularly as anti-inflammatory agents and as anticholinesterase agents. They are also useful as chemical intermediates in addition, oxidation, reduction and polymerization reactions.

Thus, for example, by reaction with amines XYNH, compounds of the type shown

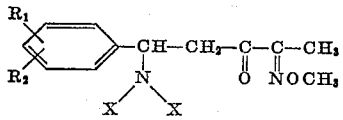

which are α-(2-keto-3-methoximino-butyl)-N,N substituted benzyl amines may be obtained.

The compounds of this invention have two double bonds and are capable of existence as cis and trans forms at the $C^1$, $C^2$ double bond, and as syn and anti forms at the $C^4$, N double bond. While ultraviolet absorption spectra measurements suggest that the disposition about the $C^1$, $C^2$ double bonds has the larger groups trans, the group disposition about the $C^4$, N double bond is not certain. It is intended, therefore, that the various stereoisomers of the compounds be considered within the purview of this invention.

The compounds of this invention are made by condensation of the suitably substituted aromatic aldehyde with 2,3-butane-dione-2-methoxime in an organic solvent, suitably, a lower alcohol, in the presence of an alkaline catalyst.

In the preferred embodiment of this invention, substantially equimolar amounts of the aromatic aldehyde and the 2,3-butane-dione-2-methoxime are reacted in ethanol or methanol, using sodium methoxide as a catalyst. The reaction proceeds satisfactorily at ambient temperatures. After a suitable reaction period which will vary with the aromatic aldehyde, ranging from several minutes to several days, the product is obtained by filtration from the reaction mixture, or by dilution of the reaction mixture with water and separation of the formed product.

The following examples are given to illustrate the present invention, but are not to be considered as limiting. Temperatures when shown are in ° C.

Example 1

A solution of 6.0 g. of piperonal (0.04 mole) and 4.6 g. (0.04 mole) of 2,3-butane-dione-2-methoxime in 25 ml. of ethanol was treated with 5 ml. of 25% sodium methoxide in methanol. Within a few moments a yellow precipitate had formed. After standing 24 hours, the reaction mixture was diluted with 100 ml. of water and 8.75 g. of 1-(3',4'-methylenedioxyphenyl)-4-methoximinopenta-1-ene-3-one was separated, melting at 137–140° (isopropyl alcohol).

Analysis.—Calcd. for $C_{13}H_{13}NO_4$: C, 63.2; H, 5.3; N, 5.7. Found: C, 63.7; H, 5.1; N, 5.8.

Example 2

In a similar manner, using p-acetamidobenzaldehyde as the aromatic aldehyde, a 0.04 mole run yielded 7.55 g. of 1-(p-acetamidophenyl)-4-methoximinopenta-1-ene-3-one, M.P. 181–182° (butyl acetate).

Analysis.—Calcd. for $C_{14}H_{16}N_2O_3$: C, 64.6; H, 6.2; N, 10.8. Found: C, 65.4; H, 6.6; N, 11.0.

Example 3

In a similar manner, using anisaldehyde as the aromatic aldehyde, a 0.04 mole run yielded 9.9 g. of 1-(p-methoxyphenyl)-4-methoximinopenta-1-ene-3-one, M.P. 55–56° (acetonitrile-water mixture).

Analysis.—Calcd. for $C_{13}H_{15}NO_3$: C, 66.9; H, 6.5; N, 6.0. Found: C, 66.7; H, 7.0; N, 5.9.

Example 4

In a similar manner using 3,4-dimethoxybenzaldehyde as the aromatic aldehyde, a 0.04 mole run yielded 11.2 g. of 1-(3',4'-dimethoxyphenyl)-4-methoximinopenta-1-ene-3-one, M.P. 102–104° (isopropyl alcohol.

Analysis.—Calcd. for $C_{14}H_{17}NO_4$: C, 63.9; H, 6.5; N, 5.3. Found: C, 63.8; H, 6.7; N, 5.2.

Example 5

In a similar manner using 2,4-dimethoxybenzaldehyde as the aromatic aldehyde, a 0.04 mole run yielded 10.7 g. of 1-(2',4'-dimethoxyphenyl)-4-methoximinopenta-1-ene-3-one, M.P. 86–87° (hexane).

Analysis.—Calcd. for $C_{14}H_{17}NO_4$: C, 63.9; H, 6.5; N, 5.3. Found: C, 63.8; H, 6.9; N, 4.8.

Example 6

In a similar manner using 2,3-dimethoxybenzaldehyde as the aromatic aldehyde, a 0.04 mole run yielded 6.5 g. of 1-(2',3'-dimethoxyphenyl)-4-methoximinopenta-1-ene-3-one, M.P. 79–80° (methanol).

Analysis.—Calcd. for $C_{14}H_{17}NO_4$: C, 63.9; H, 6.5; N, 5.3. Found: C, 64.1; H, 6.4; N, 5.1.

Example 7

In a similar manner using o-methoxybenzaldehyde as the aromatic aldehyde, a 0.04 mole run yielded 7.35 g. of 1-(o-methoxyphenyl)-4-methoximinopenta-1-ene-3-one, M.P. 74–75° (hexane).

Analysis.—Calcd. for $C_{13}H_{15}NO_3$: C, 66.9; H, 6.5; N, 6.5. Found: C, 61.0; H, 6.5; N, 5.8.

In a similar manner, the corresponding derivatives from benzaldehyde, p-tolualdehyde, p-chlorobenzaldehyde, p-bromobenzaldehyde, 4-ethoxy-3-methoxy-benzaldehyde and the like may be prepared.

Example 8

A solution of 4.88 g. (0.04 mole) of m-hydroxybenzaldehyde and 4.6 g. (0.04 mole) of 2,3-butanedione-2-methoxime in 25 ml. of ethanol was treated with 9.5 ml. of 25% sodium methoxide in methanol. The brown reaction mixture was allowed to stand for six days and then decanted into 200 ml. of water containing 2.6 ml. of glacial acetic acid. Long yellow needles of the product, 1-(m-hydroxyphenyl)-4-methoximinopenta-1-ene-3-one, which weighed 6.4 g. separated. On recrystallization from heptane, the product melted at 123–124°.

*Analysis.*—Calcd. for $C_{12}H_{13}NO_3$: C, 65.7; H, 6.0; N, 6.4. Found: C, 66.1; H, 6.0; N, 6.1.

It is to be understood that it is intended to cover all changes and modifications of the examples of the invention herein chosen for the purpose of illustration which do not constitute departures from the spirit and scope of the invention.

We claim:

1. The compound of the formula

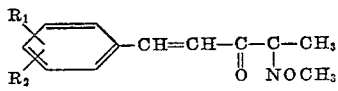

wherein $R_1$ is selected from the group consisting of hydrogen and methoxy, and $R_2$ is selected from the group consisting of hydrogen, lower alkoxy, lower alkyl, hydroxy and acetamido, and those structures wherein $R_1$ plus $R_2$ is methylenedioxy.

2. The compound

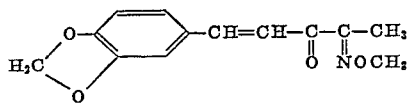

3. The compound

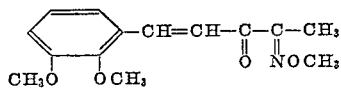

4. The compound

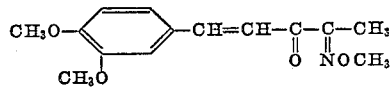

5. The compound

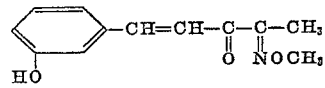

6. The compound

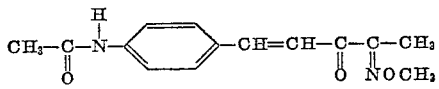

7. The method of preparing a compound of the formula

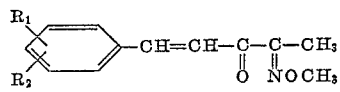

which comprises reacting an aromatic aldehyde of the formula

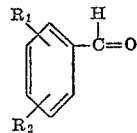

wherein $R_1$ is selected from the group consisting of hydrogen and methoxy, and $R_2$ is selected from the group consisting of hydrogen, lower alkoxy, lower alkyl, hydroxy and acetamido, and those structures wherein $R_1$ plus $R_2$ is methylenedioxy, with a substantially equivalent quantity of 2,3-butanedione-2-methoxime in a lower alcohol in the presence of lower alkoxide as an alkaline catalyst, and recovering the formed product.

No references cited.